United States Patent
Hwang et al.

(10) Patent No.: US 10,968,567 B2
(45) Date of Patent: Apr. 6, 2021

(54) METHOD FOR PREPARING α-CELLULOSE, SPINNING COMPOSITION, AND FIBER MATERIAL

(71) Applicant: INDUSTRIAL TECHNOLOGY RESEARCH INSTITUTE, Hsinchu (TW)

(72) Inventors: Shi-Kuang Hwang, Zhubei (TW); Tien-Ching Lu, Hsinchu (TW); Kai-Jen Hsiao, Zhunan Township (TW); Jing-Wen Tang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/233,684

(22) Filed: Dec. 27, 2018

(65) Prior Publication Data

US 2020/0208347 A1     Jul. 2, 2020

(51) Int. Cl.
| | | |
|---|---|---|
| *A61K 31/717* | (2006.01) | |
| *D21C 5/00* | (2006.01) | |
| *D01F 2/00* | (2006.01) | |

(52) U.S. Cl.
CPC ............... *D21C 5/00* (2013.01); *D01F 2/00* (2013.01); *D10B 2201/20* (2013.01)

(58) Field of Classification Search
CPC ............ A61K 31/717; D21C 5/00; D01F 2/00
USPC .......................................................... 536/56
See application file for complete search history.

(56) References Cited

U.S. PATENT DOCUMENTS

| | | |
|---|---|---|
| 8,834,753 B2 | 9/2014 | Hung et al. |
| 9,537,176 B2 | 1/2017 | Kobayashi et al. |
| 9,702,063 B2 | 7/2017 | Hung et al. |

FOREIGN PATENT DOCUMENTS

| | | |
|---|---|---|
| CN | 101418477 A | 4/2009 |
| CN | 103082827 A | 5/2013 |
| CN | 103215678 A | 7/2013 |
| CN | 103215753 A | 7/2013 |
| CN | 103668735 A | 3/2014 |
| CN | 104428926 A | 3/2015 |
| JP | 2798882 B2 | 9/1998 |
| TW | I338729 B | 3/2011 |
| TW | I625433 B | 6/2018 |
| WO | WO 2018/136763 A1 | 7/2018 |

OTHER PUBLICATIONS

Alghooneh et al. (International Journal of Food Properties, 2017, vol. 20, No. 11, 2830-2843).*
Du et al. (Chinese Journal of Chemical Engineering, 19(5) 792-798 (2011)).*
Taiwanese Office Action and Search Report for Taiwanese Application No. 107147362, dated Dec. 31, 2019.
Wang et al., "Optimization of extracting technology for coffee cellulose and characterization of its microstructure," Chemical Industry and Engineering Progress, vol. 36, No. 6, 2017, pp. 2262-2269 (8 pages total).
Heinze et al., "Solvents Applied in the Field of Cellulose Chemistry—A Mini Review", Polímeros: Ciência e Tecnologia, vol. 15, No. 2, 2005, pp. 84-90.

* cited by examiner

*Primary Examiner* — Shaojia A Jiang
*Assistant Examiner* — Michael C Henry
(74) *Attorney, Agent, or Firm* — Birch, Stewart, Kolasch & Birch, LLP

(57) ABSTRACT

A method for preparing α-cellulose, a spinning composition, and a fiber material are provided. The method for preparing α-cellulose includes providing a coffee residue; subjecting the coffee residue to a decolorization treatment, obtaining a white powder; reacting the white powder with an alkaline solution, obtaining a mixture; filtering the mixture to produce a filter cake; and baking the filter cake to obtain α-cellulose.

5 Claims, 1 Drawing Sheet

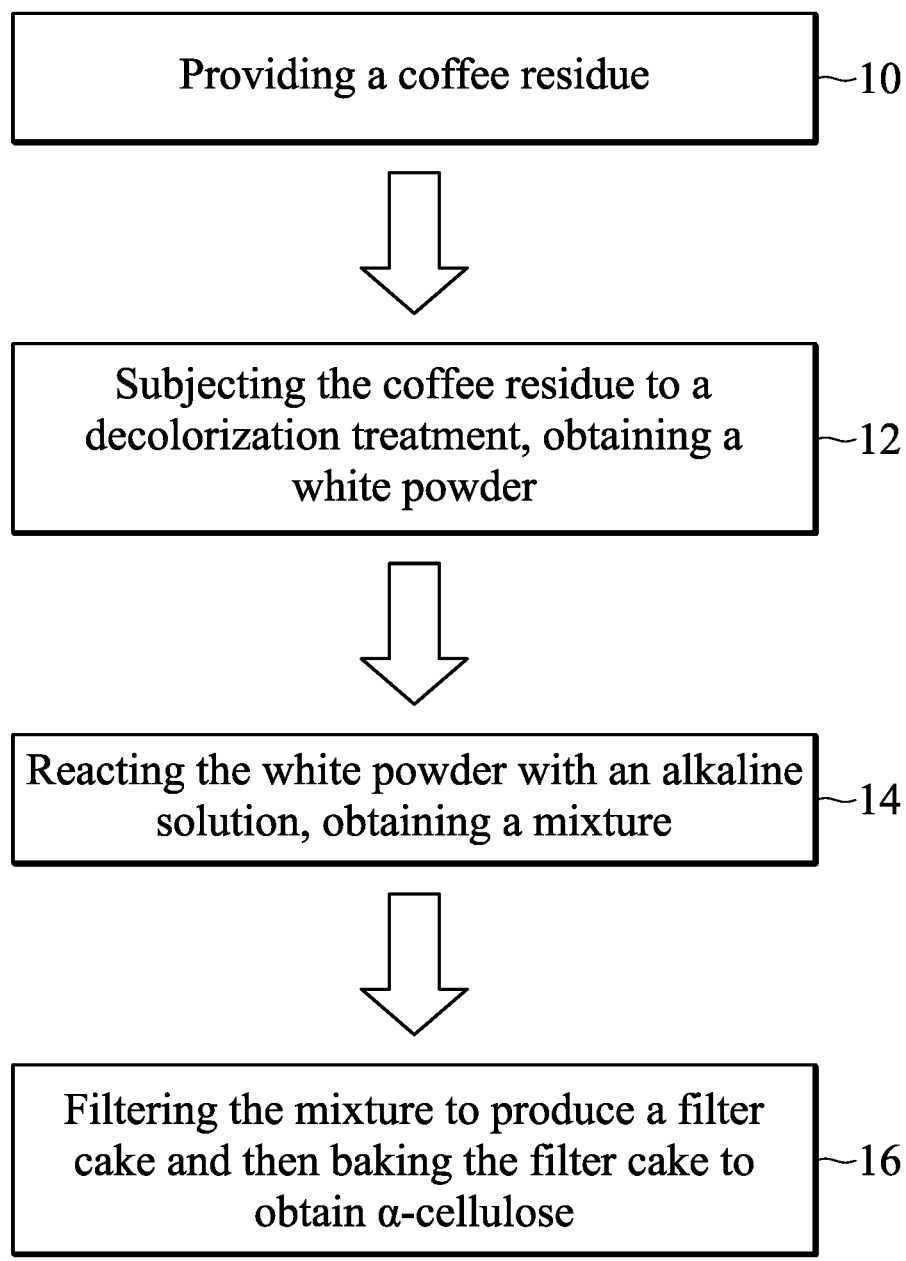

METHOD FOR PREPARING α-CELLULOSE, SPINNING COMPOSITION, AND FIBER MATERIAL

TECHNICAL FIELD

The disclosure relates to a method for preparing α-cellulose, a spinning composition, and a fiber material.

BACKGROUND

With the development of circular economy model, people pay more and more attention to environmentally friendly materials.

Coffee grounds are biodegradable materials and can be buried without causing environmental pollution, but it can still make the land unable to load. Although the industry has proposed a lot of applications for utilizing coffee grounds, all of them belong to low-level applications. The incineration of coffee grounds requires a great deal of additional energy, which is a burden on the environment.

It is possible to extract cellulose from agricultural waste and fiber using existing technology. However, the recovery efficiency of agricultural waste (such as rice stalk, pericarp, etc.) is not good. Furthermore, the apparent specific gravity of agricultural waste is low, resulting in high transportation costs. Thus, the fiber prepared from agricultural waste comes at a high cost.

Therefore, industry needs a novel method for preparing cellulose to solve the aforementioned problems.

SUMMARY

According to embodiments of the disclosure, the disclosure provides a method for preparing α-cellulose. The method includes providing a coffee residue; subjecting the coffee residue to a decolorization treatment, obtaining a white powder; reacting the white powder with an alkaline solution, obtaining a mixture; and filtering the mixture to produce a filter cake and then baking the filter cake to obtain α-cellulose.

According to embodiments of the disclosure, the white powder is reacted with the alkaline solution for a period of 30-240 min.

According to embodiments of the disclosure, the decolorization treatment comprises the following steps: mixing 100 parts by weight of coffee residue, 300-1500 parts by weight of water, and 5-30 parts by weight of sodium hydroxide, obtaining a first solution; adding 10-150 parts by weight of hydrogen peroxide into the first solution to undergo a reaction, obtaining a second solution; and filtering the second solution to produce a filter cake and then baking the filter cake to obtain the white powder.

According to embodiments of the disclosure, the first solution is reacted with the hydrogen peroxide for a period of 100-360 min.

According to embodiments of the disclosure, the alkaline solution includes sodium hydroxide and water, wherein the weight ratio of sodium hydroxide to water is from 18:100 to 25:100.

According to embodiments of the disclosure, the weight ratio of the white powder to sodium hydroxide is from 1:1 to 1:2.

According to embodiments of the disclosure, after filtering the mixture to produce the filter cake, the method for preparing α-cellulose further includes: washing the filter cake with 50° C.-80° C. hot water in order to remove residual sodium hydroxide.

According to embodiments of the disclosure, the disclosure provides a spinning composition. The spinning composition includes a first cellulose and N-methylmorpholine-N-oxide. The first cellulose is the α-cellulose prepared by the aforementioned method for preparing α-cellulose.

According to embodiments of the disclosure, the weight ratio of the first cellulose to the N-methylmorpholine-N-oxide is from 4:100 to 10:100.

According to embodiments of the disclosure, the first cellulose has an average degree of polymerization from 350 to 480.

According to embodiments of the disclosure, the spinning composition can further include a second cellulose, wherein the second cellulose has an average degree of polymerization from 500 to 3000.

According to embodiments of the disclosure, the ratio of the sum of the weight of the first cellulose and the second cellulose to the weight of N-methylmorpholine-N-oxide is 4:100 to 10:100.

According to some embodiments of the disclosure, the disclosure also provides a fiber material, wherein the fiber material is prepared by subjecting the aforementioned spinning composition to a spinning process.

According to embodiments of the disclosure, wherein the spinning process includes the following steps: introducing the spinning composition into a spinning machine, and heating the spinning composition to 50° C.-80° C.; and extruding the spinning composition from a nozzle of the spinning machine into a coagulation bath, precipitating the fiber material.

A detailed description is given in the following embodiments with reference to the accompanying drawings.

BRIEF DESCRIPTION OF THE DRAWINGS

FIG. 1 is a flow chart illustrating a method for preparing α-cellulose according to an embodiment of the disclosure.

DETAILED DESCRIPTION

The following description is of the best-contemplated mode of carrying out the method for preparing α-cellulose, the spinning composition, and the fiber material of the disclosure. This description is made for the purpose of illustrating the general principles of the disclosure and should not be taken in a limiting sense. The scope of the disclosure is best determined by reference to the appended claims.

The disclosure provides a method for preparing α-cellulose, wherein the method for preparing α-cellulose use the coffee residue as raw material. Since the coffee residue has high recovery efficiency and relatively high apparent specific gravity, the production cost of α-cellulose prepared from the coffee residue is relatively low, in comparison with the production cost of α-cellulose prepared from the agricultural waste (such as rice stalk, pericarp, etc.). The method for preparing α-cellulose of the disclosure utilize a chemical pathway to remove the lignin and semi-cellulose from coffee grounds, in order to extract the α-cellulose from the coffee grounds. As a result, the purpose of reducing waste and protecting the environment can be achieved.

According to embodiments of the disclosure, the α-cellulose prepared from the method of the disclosure can further dissolve in N-methylmorpholine-N-oxide and/or be in combination with other cellulose with relatively high average degree of polymerization in order to serve as a spinning composition.

According to embodiments of the disclosure, the fiber material, prepared by subjecting the spinning composition to a spinning process, exhibits superior thermal stability, light stability and static resistance.

FIG. 1 is a flow chart illustrating a method for preparing α-cellulose 100 according to an embodiment of the disclosure. As show in FIG. 1, the method for preparing α-cellulose of the disclosure includes the following steps. First, a coffee residue is provided (steps 10). The coffee residue (such as residue of coffee beans after grinding and extraction) can be dried to remove water thereof, wherein the temperature for drying the coffee residue can be from 60° C. to 100° C.

Next, the coffee residue is subjected to a decolorization treatment, obtaining a white powder (steps 12). According to embodiments of the disclosure, the decolorization treatment comprises the following steps. 100 parts by weight of coffee residue, about 300-1500 parts by weight (such as about 300-1200 parts by weight, or about 300-1000 parts by weight) of water, and about 5-30 parts by weight (such as about 5-25 parts by weight, or about 5-20 parts by weight) of sodium hydroxide are mixed to obtain a first solution. According to embodiments of the disclosure, the ratio of sodium hydroxide to water is from about 0.005 to 0.03. Next, about 10-150 parts by weight (such as about 10-120 parts by weight, or about 10-100 parts by weight) of hydrogen peroxide is added into the first solution to undergo a reaction, obtaining a second solution. Next, the second solution is filtered to produce a filter cake. The filter cake can be washed with water (such as 25-80° C. water). Next, the filter cake is baked to obtain a white powder. In particular, the temperature for baking the filter cake can be from about 60° C. to 100° C.

According to embodiments of the disclosure, the first solution is reacted with the hydrogen peroxide for a period of 100-360 min at a temperature of 5° C.-80° C. (such as room temperature (about 25° C.)). According to embodiments of the disclosure, the ratio of hydrogen peroxide to water within the first solution is from about 0.01 to 0.15.

Next, the white powder is reacted with an alkaline solution, obtaining a mixture (steps 14). According to embodiments of the disclosure, the white powder is reacted with the alkaline solution for a period of 30-240 min at a temperature of 5° C.-80° C. (such as room temperature (about 25° C.)).

According to embodiments of the disclosure, the alkaline solution includes sodium hydroxide and water. According to embodiments of the disclosure, the weight ratio of sodium hydroxide to water is from 18:100 to 25:100. When the ratio of sodium hydroxide to water in the alkaline solution is too low, the lignin and semi-cellulose of the coffee grounds would not be removed completely. When the ratio of sodium hydroxide to water in the alkaline solution is too high, the excess sodium hydroxide, which is remained in the α-cellulose, should be removed, thereby resulting increased cost and process complexity. According to embodiments of the disclosure, the weight ratio of the white powder to sodium hydroxide is from about 1:1 to 1:2, such as 1:1.2, 1:1.4, 1:1.6, or 1:1.8.

Finally, the mixture is filtered to produce a filter cake and then the filter cake is baked to obtain α-cellulose (steps 16). According to embodiments of the disclosure, after filtering the mixture to produce the filter cake, the filter cake can be washed with 50° C.-80° C. hot water several times, until the filtrate liquid has a pH value of about 7-8, in order to remove sodium hydroxide. According to embodiments of the disclosure, the filter cake is dried at 70° C.-100° C. temperature under vacuum.

The disclosure also provides a spinning composition. According to embodiments of the disclosure, the spinning composition can include a first cellulose and N-methylmorpholine-N-oxide, wherein the first cellulose can be the α-cellulose prepared by the aforementioned method for preparing α-cellulose.

According to embodiments of the disclosure, the spinning composition may consist of a first cellulose and N-methylmorpholine-N-oxide wherein the first cellulose can be the α-cellulose prepared by the aforementioned method for preparing α-cellulose.

According to embodiments of the disclosure, in the spinning composition, the weight ratio of the first cellulose to N-methylmorpholine-N-oxide can be from 4:100 to 10:100, such as about 5:100, 6:100, 7:100, 8:100, or 9:100. According to embodiments of the disclosure, the intrinsic viscosity of the first cellulose can be from 1.8 dL/g to 2.7 dL/g, and the average degree of polymerization of the first cellulose can be from about 350 to 480. Herein, the method for measuring the intrinsic viscosity is performed according to CNS 7748 at 25° C. In addition, the average degree of polymerization of the cellulose is determined using the following equation: $[\eta]=9.82\times10^{-3} DP^{0.9}$, wherein DP refers to the average degree of polymerization and η refers to the intrinsic viscosity of the cellulose.

According to embodiments of the disclosure, in order to enhance the strength of the fiber material prepared by the spinning composition, the spinning composition can further include a second cellulose. As a result, the strength of the fiber material can be adjusted.

According to embodiments of the disclosure, the spinning composition may consist of a first cellulose, a second cellulose and N-methylmorpholine-N-oxide, wherein the first cellulose can be the α-cellulose prepared by the aforementioned method for preparing α-cellulose.

According to embodiments of the disclosure, the average degree of polymerization of the second cellulose can be from about 500 to 3000. According to embodiments of the disclosure, the weight ratio of the first cellulose to the second cellulose can be from 1:99 to 99:1, such as 10:90, 20:80, 30:70, 40:60, 50:50, 60:40, 70:30, 80:20, or 90:10.

According to embodiments of the disclosure, the ratio of the sum of the weight of the first cellulose and the second cellulose to the weight of N-methylmorpholine-N-oxide is 4:100 to 10:100, such as about 5:100, 6:100, 7:100, 8:100, or 9:100. When the ratio of the sum of the weight of the first cellulose and the second cellulose to the weight of N-methylmorpholine-N-oxide is too low, the obtained fiber would exhibit poor strength resulting in poor spinning performance and broken yarn. When the ratio of the sum of the weight of the first cellulose and the second cellulose to the weight of N-methylmorpholine-N-oxide is too high, the spinning composition would exhibit poor flowability due to high viscosity of the spinning composition. Therefore, the precipitation time of the fiber is increased, the spinning rate is reduced and the production efficiency is poor, while the spinning composition is subjected to a solvent replacement in the coagulation bath.

According to embodiments of the disclosure, the method for preparing the spinning composition can include the following steps. First, nitrogen gas is introduced into a slurry preparation tank, and the temperature of the slurry preparation tank is raised to 50° C.-95° C. Next, the cellulose (such as the first cellulose, or the mixture of the first cellulose and the second cellulose) and solvent N-methylmorpholine-N-oxide (NMMO) are added into the slurry preparation tank and the mixture is stirred under nitrogen atmosphere. After stirring at 50° C.-95° C. for about 30 min-120 min, the temperature of the slurry preparation tank is raised to about 120° C. The result is stirred until the cellulose (such as the first cellulose, or the mixture of the first cellulose and the second cellulose) is completely dissolved in N-methylmorpholine-N-oxide, obtaining a N-methylmorpholine-N-oxide solution (serving as a spinning composition).

According to embodiments of the disclosure, the N-methylmorpholine-N-oxide solution can be further filtered and then the spinning composition is obtained.

The disclosure also provides a fiber material which is prepared by subjecting the aforementioned spinning composition to a spinning process. According to embodiments of the disclosure, the method for preparing the fiber material of the disclosure includes the following steps. First, the spinning composition is introduced into a spinning machine and the spinning machine is filled with nitrogen gas. Next, the spinning machine is heated to 50° C.-80° C. Next, the spinning composition is extruded from a nozzle of the spinning machine into a coagulation bath. After the spinning composition is subjected to a solvent replacement in the coagulation bath, the fiber material is precipitated in the coagulation bath.

According to embodiments of the disclosure, the coagulation bath includes water and N-methylmorpholine-N-oxide, wherein the ratio of N-methylmorpholine-N-oxide to water can be from about 1:9 to 1:1, such as 1:8, 1:7, 1:6, 1:5, 1:4, 1:3, or 1:2. When the ratio of N-methylmorpholine-N-oxide to water is too low, the fiber material having defects and exhibiting poor strength would be obtained, due to the relatively high solvent (NMMO) replacement rate in the coagulation bath. When the ratio of N-methylmorpholine-N-oxide to water is too high, the spinning rate is reduced and the production efficiency is poor, due to the relatively low solvent (NMMO) replacement rate in the coagulation bath.

According to embodiments of the disclosure, the distance between the nozzle of the spinning machine and the coagulation bath is from about 0.5 cm to 2.0 cm. According to embodiments of the disclosure, the fiber material can be further washed with water. After drying, the fiber material is collected by a winding roller to produce yarn. The fiber material can have a fiber fineness from about 0.1 dpf to 10 dpf. According to embodiments of the disclosure, the fiber fineness of the fiber material is determined according to ASTM D1577-07.

According to embodiments of the disclosure, the strength of the fiber material can be about from 1.3 g/d to 2.0 g/d, when the spinning composition consists of the first cellulose (prepared from the method for preparing α-cellulose of the disclosure) and N-methylmorpholine-N-oxide.

In addition, according to embodiments of the disclosure, the strength of the fiber material can be about from 2.00 g/d to 4.50 g/d, when the spinning composition includes first cellulose, the second cellulose (having an average degree of polymerization from about 500 to 3000) and N-methylmorpholine-N-oxide. According to embodiments of the disclosure, the strength of the fiber material of the disclosure is determined with a universal testing machine (UTM) according to ASTM D885.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

Preparation of α-Cellulose

Example 1

100 parts by weight of coffee grounds (dried at 80° C. for 120 min), 16.7 parts by weight of sodium hydroxide and 1083 parts by weight of water were added into a reaction bottle. After sufficiently stirring at room temperature, 33.3 parts by weight of hydrogen peroxide was added into the reaction bottle. After stirring at room temperature for 3 hr, white precipitate was formed instantly. Next, the result was filtered and then the filter cake was washed with water two times. Next, after drying the filter cake at 80° C., a white powder was obtained.

Next, 100 parts by weight of the white powder, 106.25 parts by weight of sodium hydroxide, and 500 parts by weight of water were added into a reaction bottle. Next, after stirring at room temperature for 1 hr, the result was filtered and then the filter cake was collected. Next, the filter cake was washed with 50° C.-80° C. hot water until the filtrate liquid had a pH value of about 7-8 in order to remove residual sodium hydroxide within the filter cake. Next, after drying the filter cake at 80° C., α-cellulose (with an intrinsic viscosity of about 2.21 dL/g, and an average degree of polymerization of about 412) was obtained.

Preparation of Spinning Composition

Example 2

6.5 parts by weight of α-cellulose (prepared by Example 1) and 100 parts by weight of N-methylmorpholine-N-oxide (NMMO) were added into a slurry preparation tank, and the temperature of the slurry preparation tank was adjusted to 95° C. Next, the mixture of the α-cellulose and N-methylmorpholine-N-oxide was stirred at 90° C. (the inner temperature of the slurry preparation tank) under nitrogen atmosphere. Next, after stirring for 1 hr, the temperature of the slurry preparation tank was raised to about 120° C. The result was stirred until the cellulose was completely dissolved in N-methylmorpholine-N-oxide. Next, after cooling to room temperature, the result was filtered and the then the filtrate liquid was collected, obtaining Spinning Composition (1).

Example 3

3.25 parts by weight of α-cellulose (prepared by Example 1), 3.25 parts by weight of commercially available cellulose (with an intrinsic viscosity of about 3.4 dL/g and an average degree of polymerization of about 630) and 100 parts by weight of N-methylmorpholine-N-oxide (NMMO) were added into a slurry preparation tank, and the temperature of the slurry preparation tank was raised to 95° C. Next, the mixture of the α-cellulose and N-methylmorpholine-N-oxide was stirred at 90° C. (the inner temperature of the slurry preparation tank) under nitrogen atmosphere. Next, after stirring for 1 hr, the temperature of the slurry preparation tank was raised to about 120° C. The result was stirred until the cellulose was completely dissolved in N-methylmorpholine-N-oxide. Next, after cooling to room temperature, the result was filtered and the then the filtrate liquid was collected, obtaining Spinning Composition (2).

Example 4

4.55 parts by weight of α-cellulose (prepared by Example 1), 1.95 parts by weight of commercially available cellulose (with an intrinsic viscosity of about 3.4 dL/g and an average degree of polymerization of about 630) and 100 parts by weight of N-methylmorpholine-N-oxide (NMMO) were added into a slurry preparation tank, and the temperature of the slurry preparation tank was raised to 95° C. Next, the mixture of the α-cellulose and N-methylmorpholine-N-oxide was stirred at 90° C. (the inner temperature of the slurry preparation tank) under nitrogen atmosphere. Next, after stirring for 1 hr, the temperature of the slurry preparation tank was raised to about 120° C. The result was stirred until the cellulose was completely dissolved in N-methylmorpholine-N-oxide. Next, after cooling to room temperature, the result was filtered and the then the filtrate liquid was collected, obtaining Spinning Composition (3).

Preparation of Fiber Material

Example 5

First, Spinning composition (1) was introduced into a spinning machine and then the spinning machine was filled with nitrogen gas. Next, the temperature of the spinning machine was raised to about 70° C.-80° C. Next, Spinning composition (1) was extruded from a nozzle of the spinning machine into a coagulation bath (with a temperature of 25° C.). The coagulation bath consisted of water and N-methylmorpholine-N-oxide (the weight ratio of water and N-methylmorpholine-N-oxide was 4:1), and the distance between the coagulation bath and the nozzle was 1.0 cm. After Spinning composition (1) was subjected to a solvent replacement in the coagulation bath, the fibers were precipitated in the coagulation bath. Next, the fibers were washed with water. After drying, the fibers were collected by a winding roller (with a rolling speed of 16.2 m/min) to produce Fiber material (1). The fiber fineness and fiber strength of Fiber material (1) were measured and the result is shown in Table 1.

Example 6

Example 6 was performed in the same manner as Example 5 except that Spinning composition (2) was substituted for Spinning composition (1), obtaining Fiber material (2). The fiber fineness and fiber strength of Fiber material (2) were measured and the result is shown in Table 1.

Example 7

Example 7 was performed in the same manner as Example 5 except that Spinning composition (3) was substituted for Spinning composition (1), obtaining Fiber material (3). The fiber fineness and fiber strength of Fiber material (3) were measured and the result is shown in Table 1.

TABLE 1

| | α-cellulose (parts by weight) | commercially available cellulose (parts by weight) | NMMO (parts by weight) | fiber fineness (dpf) | fiber strength (g/d) |
|---|---|---|---|---|---|
| Example 5 | 6.50 | 0 | 100 | 2.12 | 1.33 |
| Example 6 | 3.25 | 3.25 | 100 | 2.26 | 3.58 |
| Example 7 | 4.55 | 1.95 | 100 | 2.19 | 2.37 |

As shown in Table 1, the cellulose prepared from coffee grounds can be employed alone or in combination with other cellulose with various average degree of polymerization in order to serve as a spinning composition. As a result, the purpose of modifying the physical properties of the fiber material can be achieved.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A method for preparing α-cellulose, comprising:
   providing a coffee residue;
   subjecting the coffee residue to a decolorization treatment, obtaining a white powder;
   reacting the white powder with an alkaline solution after the decolorization treatment, obtaining a mixture, wherein the alkaline solution comprises sodium hydroxide and water, wherein the weight ratio of sodium hydroxide to water is from 18:100 to 25:100, and wherein the weight ratio of the white powder to sodium hydroxide is from 1:1 to 1:2; and
   filtering the mixture to produce a filter cake and then baking the filter cake to obtain α-cellulose.

2. The method as claimed in claim 1, wherein the white powder is reacted with the alkaline solution for a period of 30-240 min.

3. The method as claimed in claim 1, wherein the decolorization treatment comprises following steps:
   mixing 100 parts by weight of coffee residue, 300-1500 parts by weight of water, and 5-30 parts by weight of sodium hydroxide, obtaining a first solution;
   adding 10-150 parts by weight of hydrogen peroxide into the first solution to undergo a reaction, obtaining a second solution; and
   filtering the second solution to produce a filter cake and then baking the filter cake to obtain the white powder.

4. The method as claimed in claim 3, wherein the first solution is reacted with the hydrogen peroxide for a period of 100-360 min.

5. The method as claimed in claim 1, after filtering the mixture to produce the filter cake, further comprising: washing the filter cake with 50° C.-80° C. hot water in order to remove residual sodium hydroxide.

* * * * *